United States Patent
Numata

(10) Patent No.: US 10,193,950 B2
(45) Date of Patent: Jan. 29, 2019

(54) NETWORK SYSTEM AND CONTROL METHOD

(71) Applicant: CANON KABUSHIKI KAISHA, Tokyo (JP)

(72) Inventor: Masahito Numata, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 361 days.

(21) Appl. No.: 14/931,481

(22) Filed: Nov. 3, 2015

(65) Prior Publication Data

US 2016/0134681 A1 May 12, 2016

(30) Foreign Application Priority Data

Nov. 6, 2014 (JP) .................. 2014-226273

(51) Int. Cl.
*H04L 29/08* (2006.01)
*G06F 17/30* (2006.01)

(52) U.S. Cl.
CPC ........ *H04L 67/02* (2013.01); *G06F 17/30873* (2013.01)

(58) Field of Classification Search
CPC ........................... H04L 67/02; G06F 17/30873
USPC ........................................................ 709/218
See application file for complete search history.

(56) References Cited

U.S. PATENT DOCUMENTS

| | | | | |
|---|---|---|---|---|
| 6,085,224 A * | 7/2000 | Wagner | ........ | H04L 29/06 709/203 |
| 8,751,608 B2 * | 6/2014 | Sogo | ........ | H04L 67/14 709/219 |
| 2005/0066037 A1 | 3/2005 | Song | | |
| 2011/0225141 A1 * | 9/2011 | Chaudhry | ........ | G06F 17/30132 707/709 |
| 2015/0089352 A1 * | 3/2015 | Conboy | ........ | G06F 12/0862 715/234 |

FOREIGN PATENT DOCUMENTS

JP 2013-120603 A 6/2013

OTHER PUBLICATIONS

Abhishek, How to Auto Login Website in Chrome, Firefox & IE, Jan. 27, 2012, technixupdate.com (4 pages).*
Hsieh, Ming-Deng, et al., "Stateful Session Handoff for Mobile WWW", Information Sciences, 2006, pp. 1241-1265, vol. 176, Elsevier, Inc.

(Continued)

*Primary Examiner* — Wing F Chan
*Assistant Examiner* — Leon Y Tseng
(74) *Attorney, Agent, or Firm* — Canon U.S.A., Inc. IP Division

(57) ABSTRACT

When a data sharing server receives an instruction to share a first tab of a first web browser of an information processing apparatus serving as a sharing source with a second web browser of an information processing apparatus serving as a browsing terminal, the data sharing server transmits access data and data on session storage related to the first tab to the second web browser. The data sharing server deletes association between the data on the session storage and the information processing apparatus serving as the sharing source, and associates the data on the session storage with the information processing apparatus serving as the browsing terminal.

8 Claims, 17 Drawing Sheets

| ACCOUNT INFORMATION | INFORMATION PROCESSING APPARATUS | TAB ID | URL | PAGE TITLE | SessionStorage | TIME STAMP |
|---|---|---|---|---|---|---|
| user01@xxx.com | TABLET | aaaa-dkeu-fked | http://www.shop.com | SHOPPING | {"SessionStorage":[...]} | 2014/08/12 10:12:54 |
| user01@xxx.com | TABLET | uked-erdc-ktie | http://www.blog.com | BLOG | | 2014/08/12 10:12:54 |
| user01@xxx.com | TABLET | leqe-dcye-fmxc | http://www.map.com | MAP SITE | {"SessionStorage":[...]} | 2014/08/12 10:12:54 |
| user01@xxx.com | PC | | | | | 2014/08/12 10:20:45 |

*1101 1102 1103 1104 1105 1106 1107*

(56) References Cited

OTHER PUBLICATIONS

De Carvalho, Leandro G., et al., "Synchronizing Web Browsing Data with Browserver", Conference: Proceedings of the 15th IEEE Symposium on Computers and Communications, Jun. 22-25, 2010, pp. 738-743, Riccione, Italy.

* cited by examiner

FIG.5

```
{
  "SessionStorage": [
    {
      "website": "http://shop.com",
      "storage": [
        {"key": "page", "value": "1"},
        {"key": "cartsessionId", "value": "abdixksd"}
      ]
    },
    {
      "website": "http://ad.com",
      "storage": [
        {"key": "xxx", "value": "aaa"},
        {"key": "yyy", "value": "bbb"}
      ]
    }
  ]
}
```

501 → "website": "http://shop.com"
502 → {"key": "page", "value": "1"}
501 → "website": "http://ad.com"
502 → {"key": "xxx", "value": "aaa"}

FIG.11

| ACCOUNT INFORMATION | INFORMATION PROCESSING APPARATUS | TAB ID | URL | PAGE TITLE | SessionStorage | TIME STAMP |
|---|---|---|---|---|---|---|
| user01@xxx.com | TABLET | aaaa-dkeu-fked | http://www.shop.com | SHOPPING | {"SessionStorage":[...]} | 2014/08/12 10:12:54 |
| user01@xxx.com | TABLET | uked-erdc-ktie | http://www.blog.com | BLOG | | 2014/08/12 10:12:54 |
| user01@xxx.com | TABLET | leqe-dcye-fmxc | http://www.map.com | MAP SITE | {"SessionStorage":[...]} | 2014/08/12 10:12:54 |
| user01@xxx.com | PC | | | | | 2014/08/12 10:20:45 |

| ACCOUNT INFORMATION | INFORMATION PROCESSING APPARATUS | TAB ID | URL | PAGE TITLE | SessionStorage | TIME STAMP |
|---|---|---|---|---|---|---|
| user01@xxx.com | TABLET | aaaa-dkeu-fked | http://www.shop.com | SHOPPING | | 2014/08/12 10:20:45 |
| user01@xxx.com | TABLET | uked-erdc-ktie | http://www.blog.com | BLOG | | 2014/08/12 10:12:54 |
| user01@xxx.com | TABLET | leqe-dcye-fmxc | http://www.map.com | MAP SITE | {"SessionStorage":[…]} | 2014/08/12 10:12:54 |
| user01@xxx.com | PC | opwi-djxy-whdk | http://www.shop.com | SHOPPING | {"SessionStorage":[…]} | 2014/08/12 10:20:45 |

1201　1202　1203　1204　1205　1206　1207

NETWORK SYSTEM AND CONTROL METHOD

BACKGROUND OF THE INVENTION

Field of the Invention

The present invention relates to a control method of a network system.

Description of the Related Art

With the sophistication of web applications, various function enhancements are made in HyperText Markup Language 5 (HTML5). Among the enhanced functions are web storage and IndexedDB functions for storing data in a storage area intended for a web browser.

Web storage can automatically store data into a storage area of an information terminal such as a personal computer (PC) or a smartphone from a web server side providing a website at the timing when the website is browsed. Such an enhanced function makes services that the website provides available by using locally cached data even if the PC or mobile terminal browsing the website is offline.

There has recently been a technique for sharing information about open tabs between web browsers of different information terminals. According to such a technique, for example, a website that has been browsed in a tab of a web browser of a tablet terminal can be instructed to be displayed and browsed on a web browser of a portable terminal, and vice versa.

Japanese Patent Application Laid-Open No. 2013-120603 discusses a conventional technique for sharing data between web browsers. According to the technique discussed in Japanese Patent Application Laid-Open No. 2013-120603, a server receives data determined to be sharable between web browsers, from a web browser, and stores the data. The server then transfers the stored data to a web browser of another information terminal to achieve the data sharing between the web browsers of the different information terminals.

Web storage described above includes two types of data storage modes LocalStorage and SessionStorage. LocalStorage is specified to share data in a storage area between different tabs of a web browser on an information terminal. SessionStorage is specified not to share data in a storage data between different tabs of a web browser on an information terminal. LocalStorage and SessionStorage have such a difference in specifications.

As described above, SessionStorage is specified not to share data between different tabs. According to such a specification, SessionStorage is not able to be handed over or shared between different information processing apparatuses. If SessionStorage is shared and used by different information processing apparatuses, an operation intended by the website side may be unable to be implemented because the shared use of data of SessionStorage between different information processing apparatuses violates the original specification.

The technique for sharing data between web browsers discussed in Japanese Patent Application Laid-Open No. 2013-120603 does not take account of data of such a specification for not sharing data between different tabs of a single web browser like SessionStorage (session storage). If data of a specification for not sharing data between different tabs of a single web browser like SessionStorage is shared and used between web browsers of different information processing apparatuses by using the technique discussed in Japanese Patent Application Laid-Open No. 2013-120603, an operation intended by the website side may be unable to be implemented as described above because of the violation of the original specification.

SUMMARY OF THE INVENTION

The present invention is directed to providing a mechanism for implementing the sharing of data of a specification for not sharing data between different tabs of a single web browser, like session storage, between web browsers in consideration of the specification.

According to an aspect of the present invention, a network system includes a first information processing terminal on which a first web browser runs, a second information processing terminal on which a second web browser runs, and a shared server, wherein the shared server includes a management unit configured to manage access data on a first tab of the first web browser in which to access a website and data on session storage valid for a session with the website in association with the first information processing terminal, the data on the session storage being locally managed by the first web browser in association with the first tab, a reception unit configured to receive an instruction for sharing the first tab of the first web browser with the second web browser, and a transmission unit configured to transmit the access data and the data on the session storage related to the first tab to the second web browser according to the instruction, and wherein the management unit is configured to delete association between the transmitted data on the session storage and the first information processing terminal, and manage the data on the session storage in association with the second information processing terminal.

Further features of the present invention will become apparent from the following description of exemplary embodiments with reference to the attached drawings.

BRIEF DESCRIPTION OF THE DRAWINGS

FIG. 5 illustrates an example of a data structure of SessionStorage.

FIG. 11 is a diagram illustrating an example of data of the data model managed by the data sharing server.

FIG. 12 is a diagram illustrating an example of data of the data model after a data handover.

DESCRIPTION OF THE EMBODIMENTS

A mode for carrying out the present invention will be described below with reference to the drawings.

Figure 1:
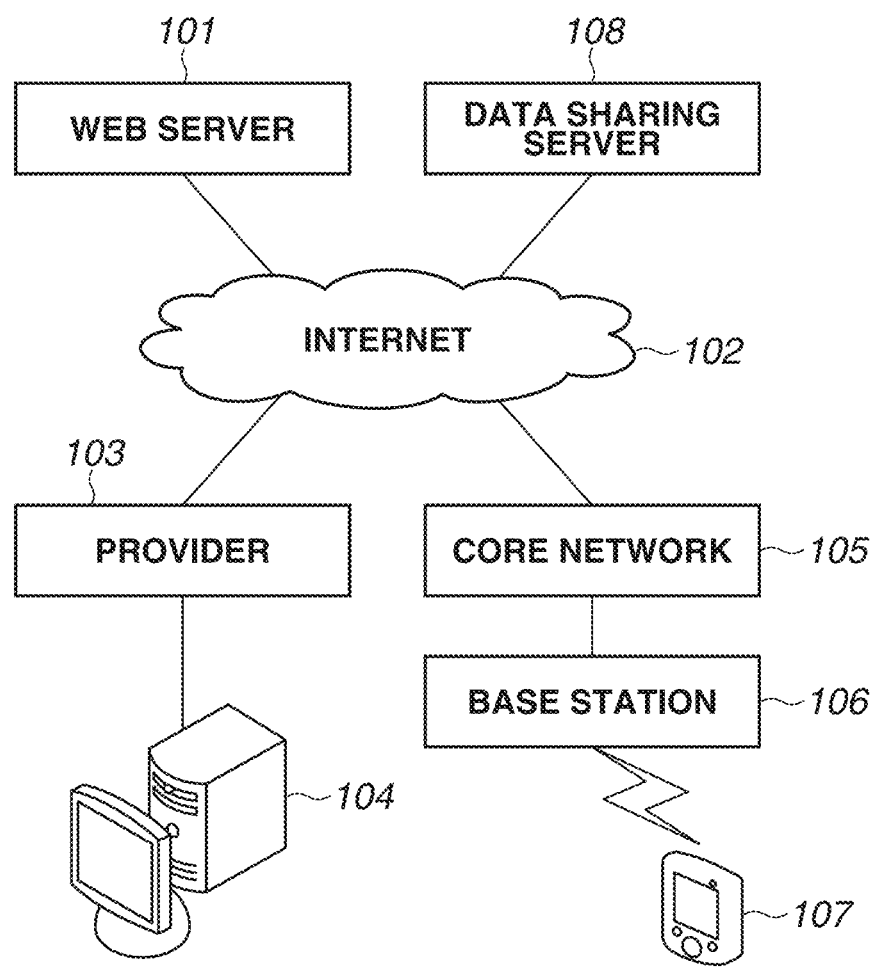
FIG. 1 is a configuration diagram of a network system illustrating an exemplary embodiment.

FIG. 1 is a diagram illustrating a configuration of a network system according to an exemplary embodiment of the present invention.

In FIG. 1, an information processing apparatus 104 is an information processing terminal that communicates with a provider 103 via an optical line and connects to the Internet 102 via the provider 103. Examples include a PC. An information processing apparatus 107 is an information processing terminal that wirelessly communicates with a base station 106 and connects to the Internet 102 via a core network 105. Examples include a tablet terminal and a smartphone.

A web server 101 is a system that provides a website for the information processing apparatuses 104 and 107 via the Internet 102. A data sharing server 108 is a server for sharing data between the information processing apparatuses 104 and 107.

Figure 2:
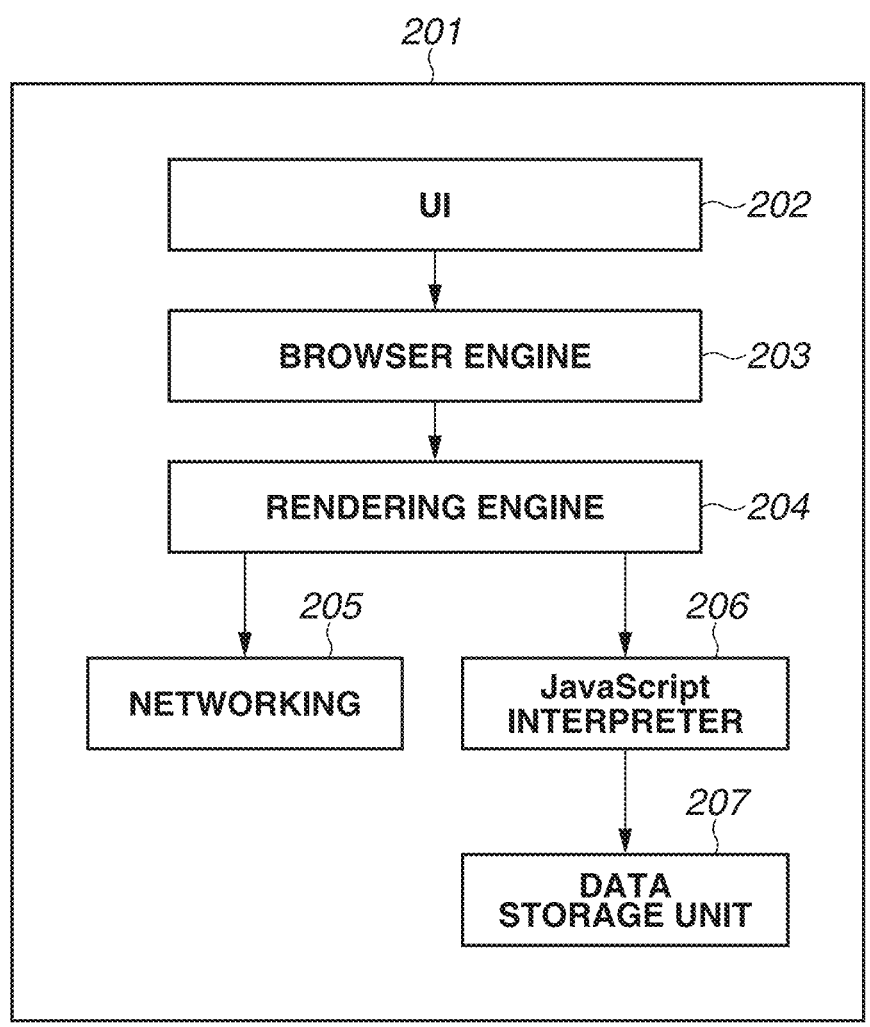
FIG. 2 is a configuration diagram of a web browser.

The information processing apparatuses 104 and 107 can execute a web browser such as a web browser 201 illustrated in FIG. 2. The information processing apparatuses 104 and 107 can browse the website provided by the web server 101 via the web browser 201.

FIG. 1 illustrates an example with only the information processing apparatuses 104 and 107, whereas there may be any number of information processing apparatuses. The information processing apparatuses are not limited to ones configured like the information processing apparatuses 104 and 107. Any information processing apparatus that can execute a web browser such as the web browser 201 illustrated in FIG. 2 may be used.

The web server 101 is not limited to any particular web server, either.

FIG. 2 is a software block diagram illustrating an overall configuration of a web browser to which an exemplary embodiment of the present invention can be applied.

In FIG. 2, the web browser 201 to which an exemplary embodiment of the present invention can be applied implements a data storage mechanism according to HTML5.

A user interface (UI) 202 is a UI of the web browser 201, including a uniform resource locator (URL) display, a bookmark display, and a setting menu display of the web browser 201.

A rendering engine 204 displays requested contents such as HyperText Markup Language (HTML). A browser engine 203 performs processing between the UI 202 and the rendering engine 204.

Networking 205 accepts a network call such as a Hypertext Transfer Protocol (HTTP) request. A JavaScript interpreter (hereinafter, JS interpreter) 206 analyzes and executes JavaScript code (Java is a registered trademark).

Figure 3:
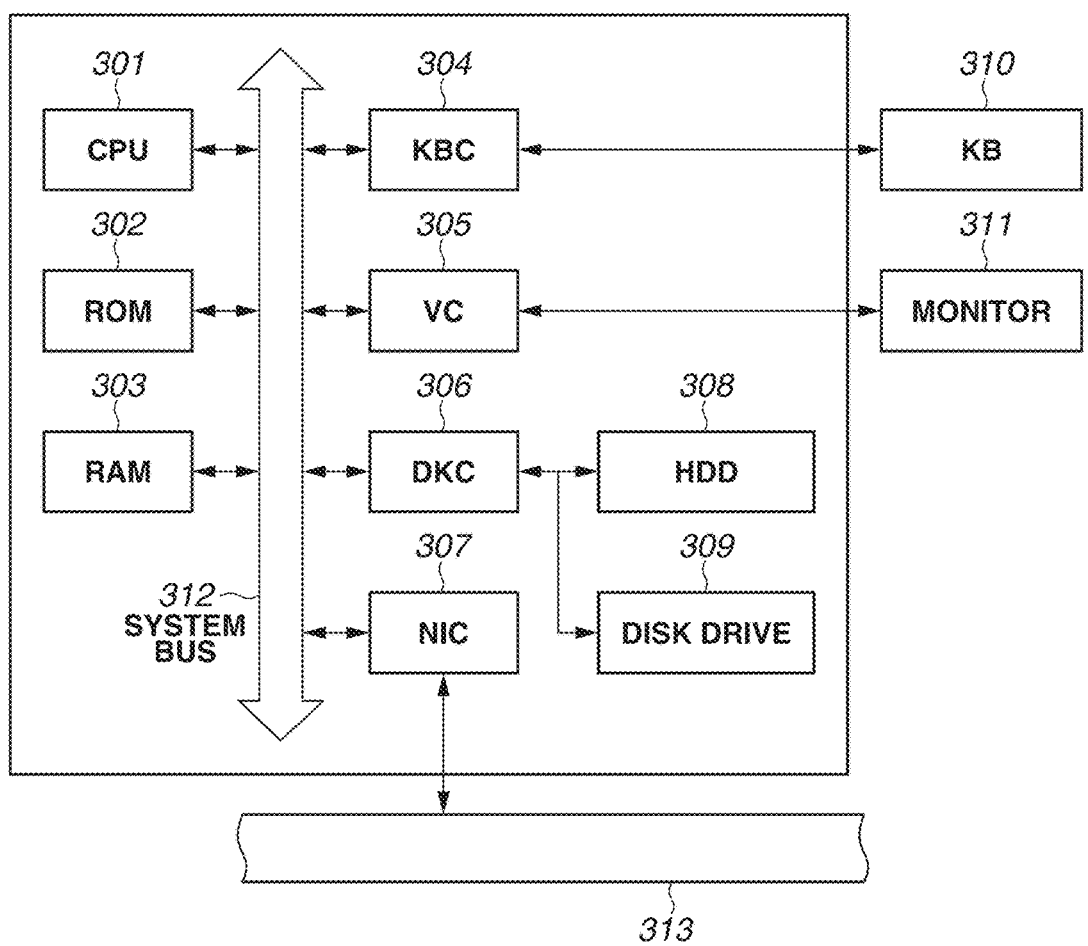
FIG. 3 is a hardware configuration diagram of an information processing apparatus, a data sharing server, and a web server.
Figure 4:
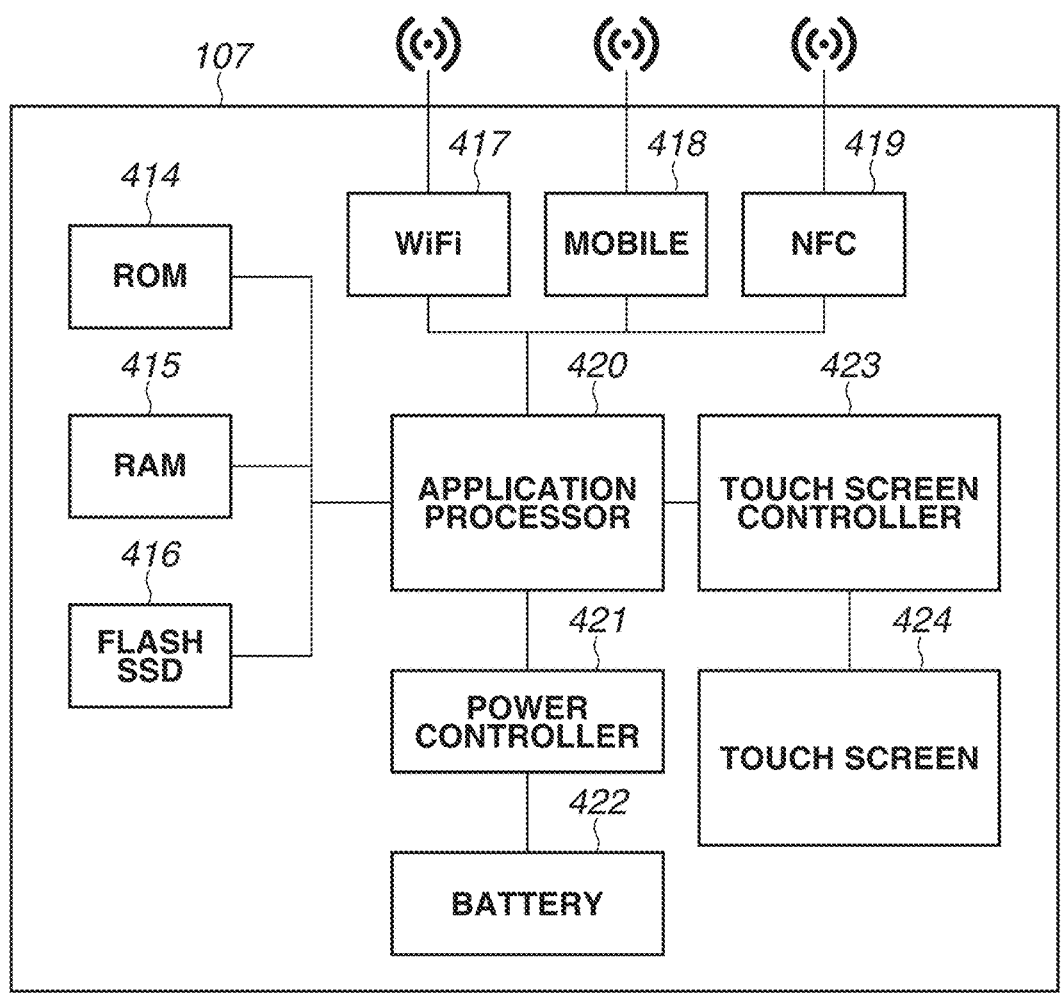
FIG. 4 is a hardware configuration diagram of an information processing apparatus (tablet).

A data storage unit 207 stores cookies, a file system of HTML 5, application caches, web storage, and IndexedDB data in a storage device (for example, a hard disk drive (HDD) 308 illustrated in FIG. 3 or a storage device 416 illustrated in FIG. 4) of the information processing apparatus 104 or 107. Operations for storing and deleting data into/from the data storage unit 207 can be controlled according to JavaScript.

FIG. 3 is a block diagram illustrating a hardware configuration of the information processing apparatus 104, the data sharing server 108, and the web server 101.

In FIG. 3, a central processing unit (CPU) 301 executes programs stored in a read-only memory (ROM) 302 and the HDD 308 serving as a storage device, with a random access memory (RAM) 303 as a work memory. The CPU 301 thereby controls components to be described below via a system bus 312.

The HDD 308 stores an operating system (OS), various programs, and data. The CPU 301 accesses the HDD 308, a disk drive 309, a network interface card (NIC) 307, and installs various programs on the HDD 308 via a disc controller (DKC) 306. The CPU 301 can communicate with other computers over a network 313 via the NIC 307. Other storage devices such as a solid state drive (SSD) may be included.

The CPU 301 displays a UI on a monitor 311 via a video card (VC) 305 according to a program. A user operates a keyboard (KB) 310 and a pointing device such as a mouse to give instructions and make inputs to the UI. The CPU 301 accepts the user instructions and inputs via a keyboard controller (KBC) 304, and performs various types of processing according to the user instructions and inputs.

In the information processing apparatus 104, the CPU 301 executes a web browser program installed on the HDD 308 to implement functions of the web browser 201 illustrated in FIG. 2. The hardware configuration example illustrated in FIG. 3 is just an example of the configuration of the information processing apparatus 104 to which an exemplary embodiment of the present invention can be applied. The information processing apparatus 104 is thus applicable to an exemplary embodiment of the present invention even if hardware other than that illustrated is included and/or if some of the components such as the disk drive 309 are not included.

FIG. 4 is a block diagram illustrating a hardware configuration of the information processing apparatus 107 on which the web browser 201 runs.

As illustrated in FIG. 4, the information processing apparatus 107 includes an application processor (hereinafter, AP) 420, a ROM 414, a RAM 415, and a storage device 416 such as a flash SSD.

The AP 420 executes programs (software) stored in the ROM 414 and the storage device 416 to comprehensively control the devices connected to the AP 420. The RAM 415 functions as a main memory or a work area of the AP 420. The storage device 416 includes a flash memory. The storage device 416 stores an operating system, various applications such as the web browser 201, database data, and user files.

The information processing apparatus 107 further includes a touch screen controller 423, which controls a touch screen 424 connected thereto.

The information processing apparatus 107 further includes a wireless local area network (LAN) control unit 417, a mobile communication control unit 418, and a near field communication control unit 419. The wireless LAN control unit 417 controls wireless LAN communications such as Wireless Fidelity (WiFi). The mobile communication control unit 418 controls mobile communications. The near field communication control unit 419 controls near field communications (NFC).

The information processing apparatus 107 further includes a power controller 421 which performs charging control and manages a remaining battery level of a battery 422.

The example illustrated in FIG. 4 is just an example of the configuration of the information processing apparatus 107 to which an exemplary embodiment of the present invention can be applied. The information processing apparatus 107 is thus applicable to an exemplary embodiment of the present invention even if hardware for providing a network connection other than that illustrated in FIG. 4 and/or hardware such as a camera is/are further included and/or if some of the components such as the near field communication control unit 419 are not included.

<Web Storage>

Next, the mechanism of web storage will be described.

Web storage includes two types of data storage modes LocalStorage (local storage) and SessionStorage (session storage). Applications on a website can specify the two types of storage modes according to the intended use, and store data in the data storage unit 207 of the web browser 201.

<LocalStorage>

LocalStorage is specified to share and use data of a website stored in the data storage unit 207 between different tabs of the web browser 201 of the information processing apparatus. For example, if the same website is browsed in tabs A and B, data stored in tab A can also be used in tab B. In LocalStorage, the stored state of the data on the website stored in the data storage unit 207 is maintained even if the web browser 201 or the tab is ended.

<SessionStorage>

SessionStorage is specified not to share or use data of a website stored in the data storage unit 207 between different tabs of the web browser 201 of the information processing apparatus. For example, if the same website is browsed in tabs A and B, data on SessionStorage that is stored in tab A and valid for the session with the website and data on SessionStorage that is stored in tab B and valid for the session with the website are managed separately from each other.

In SessionStorage, the data on the website stored in the data storage unit 207 is deleted when the web browser 201 or the tab is ended.

Because of such a characteristic, SessionStorage is used to store temporary data. For example, a shopping site uses SessionStorage to store a session ID of a shopping cart or store the page number of the currently-displayed page of a product list having a page advancing feature. Since SessionStorage does not share or use such information between different tabs, the information can be prevented from being modified in different tabs in a conflicting manner if the same website is displayed in a plurality of tabs of the web browser 201. For example, in a use case where a first tab displays the first page of a product list while another tab displays the second page for product comparison, the display of the first tab is prevented from being affected by a page advancing operation on the second tab.

The network system according to the present exemplary embodiment deals with a configuration for appropriately moving data of a specification for not sharing data between different tabs of a single web browser like SessionStorage to appropriately share a tab between web browsers running on a plurality of information terminals. With such a configuration, information about SessionStorage of web storage can also be appropriately handed over when web browsers running on a plurality of information terminals share a tab. As a result, data of a specification for not sharing data between different tabs of a single web browser like SessionStorage can be shared between web browsers in consideration of the specification.

An exemplary embodiment of the present invention will be described below by using SessionStorage as an example of the data of a specification for not sharing data between different tabs of a single web browser. However, the present invention is not limited thereto.

<Data Structure of SessionStorage>

FIG. 5 is a diagram illustrating an example of a JavaScript Object Notation (JSON) format expressing a data structure of SessionStorage.

One SessionStorage object is managed for a tab of the web browser 201.

A website 501 describes information for identifying a website. One SessionStorage object can manage one or more websites 501. There have recently been websites that each display advertisements and widgets of a third party whose domain is different from that of the website. In such cases, a plurality of websites 501 is included.

A storage 502 describes data stored for the website 501. The storage 502 manages data by using a key and a value. The storage 502 can manage zero or more combinations of a key and a value for one website 501. That the number of managed combinations of a key and a value is zero represents a state where no SessionStorage is stored for the corresponding website 501.

The data structure of SessionStorage is not limited to that illustrated in FIG. 5. The data structure is not limited to a JSON format, either.

Figure 6:
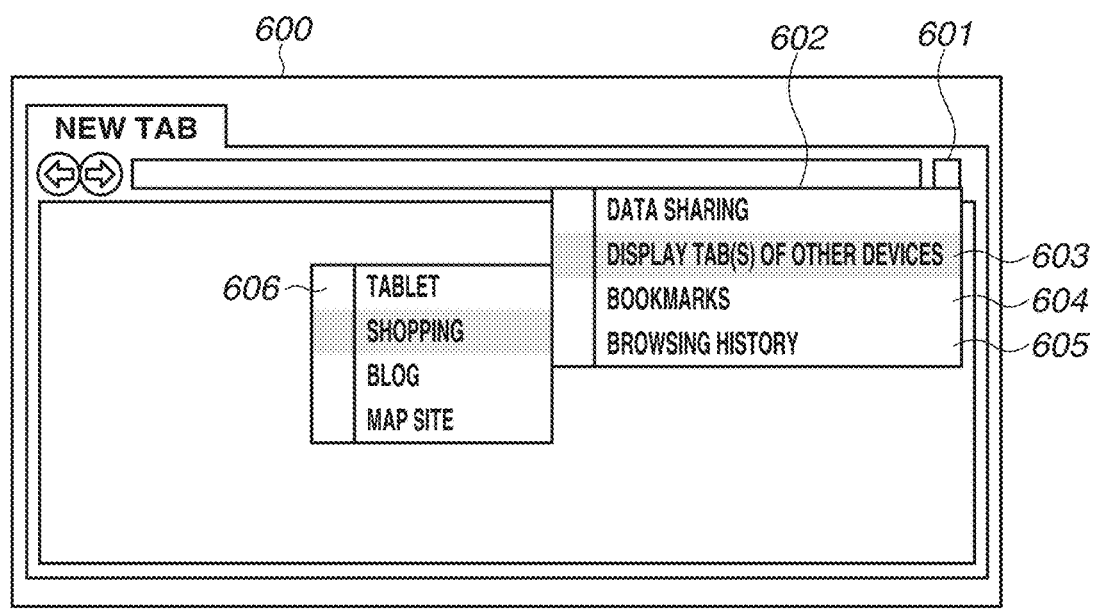
FIG. 6 is a diagram illustrating a selection screen of a tab of another web browser.

FIG. 6 is a diagram illustrating an example of a screen displayed on the web browser 201 of the information processing apparatus 104 when the information processing apparatus 104 shares and uses a tab opened in the web browser 201 of the information processing apparatus 107.

In the following description, the information processing apparatus 107 serving as a sharing source will be referred to as a sharing source apparatus 107. The information processing apparatus 104 browsing as a sharing destination will be referred to as a browsing apparatus 104. In the present exemplary embodiment, tab information about the information processing apparatus 107 is described to be shared and used by the information processing apparatus 104. However, tab information about the information processing apparatus 104 may be shared and used by the information processing apparatus 107. The sharing and using method is the same.

In FIG. 6, a screen 600 is displayed on the web browser 201 of the browsing apparatus 104. A menu button 601 is intended to call functions of the web browser 201. If the menu button 601 is pressed, the web browser 201 displays a function list (not illustrated) including "data sharing." If the "data sharing" is selected from the function list, the web browser 201 displays a data sharing category 602. The data sharing category 602 displays menus (for example, 603 to 605) for sharing and using data about the sharing source apparatus 107. In the example of FIG. 6, three menus "display tab(s) of other devices" 603, "bookmarks" 604, and "browsing history" 605 are displayed.

To share data, an account for data sharing needs to be generated. Login processing needs to be performed on a screen illustrated in FIG. 9 to be described below, of the web browsers 201 of the information processing apparatuses 104 and 107. The information processing apparatuses 104 and 107 need to be linked and managed in the same account on the data sharing server 108.

"Display tab(s) of other devices" 603 is intended to select a tab opened on the sharing source apparatus 107 and display the tab on the web browser 201 of the browsing apparatus 104. If the "display tab(s) of other devices" 603 is selected, the web browser 210 displays a display tab list 606.

The display tab list 606 is intended to display a list of tabs opened on the sharing source apparatus 107 which is a "tablet" terminal. In the example of FIG. 6, three tabs "shopping," blog," and "map site" are opened on the sharing source apparatus 107. If the user selects a tab to display from the display tab list 606, the desired tab can be opened in the web browser 201 of the browsing apparatus 104.

The "Bookmarks" 604 is intended to select and display bookmarks of the sharing source apparatus 107. The "Browsing history" 605 is intended to select and display browsing history of the sharing source apparatus 107.

In the present exemplary embodiment, the "display tab(s) of other devices" 603, the "bookmarks" 604, and the "browsing history" 605 are described as data sharing functions. However, in an exemplary embodiment of the exemplary embodiment, the data sharing functions are not limited to these three.

The "Display tab(s) of other devices" 602 can be used, for example, to browse a shopping site browsed by a tablet at home (sharing source apparatus 107) from a PC in another location (browsing apparatus 104). As described above, SessionStorage is specified not to share data between different tabs. According to such a specification, in the foregoing example, the page number of the shopping site browsed by the tablet at home (sharing source apparatus 107) and the contents of the shopping cart are not able to be handed over to and browsed by the PC in another location (browsing apparatus 104). Even if SessionStorage is shared and used by different information processing apparatuses, the sharing and use of data of the SessionStorage by different information processing apparatuses violates the original specification. According to the conventional method, an operation intended by the website side may therefore be unable to be implemented. In terms of the foregoing example, if a family member operates the tablet at home (sharing source apparatus 107) while the website continues being browsed from the PC in another location, the page number and/or the shopping cart on the PC (browsing apparatus 104) side can change in a conflicting manner. This can cause an unintended page transition or an unintended modification to the shopping cart.

A function for displaying a tab of another device in consideration of the specification of SessionStorage not to share data between different tabs is thus needed. In the present exemplary embodiment, a function for displaying a tab of another device in consideration of such a point will be described below.

Figure 7:
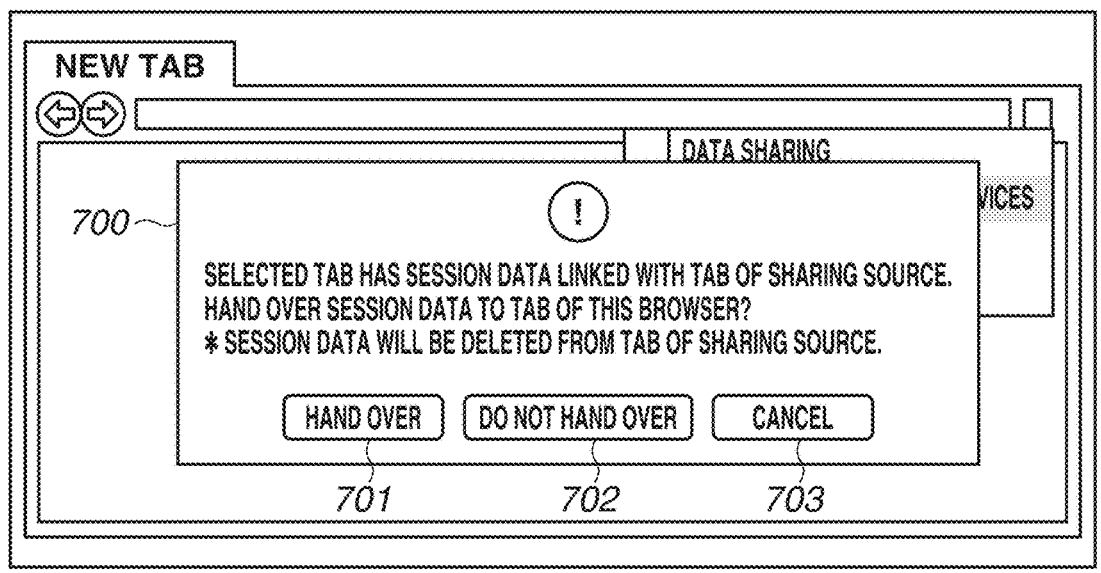
FIG. 7 is a diagram illustrating a confirmation screen for a handover of SessionStorage.

FIG. 7 is a diagram illustrating an example of a confirmation screen which is displayed on the web browser 201 of the browsing apparatus 104 when the browsing apparatus 104 issues a browsing instruction for a tab of the sharing source apparatus 107. For example, the browsing instruction is issued by selecting "shopping," "blog," or "map site" from the display tab list 606 of FIG. 6.

In FIG. 7, a confirmation screen 700 is displayed when the browsing-instructed tab of the sharing source apparatus 107 has stored data in SessionStorage.

A hand over button 701 is intended to store the data of SessionStorage having been stored in the data storage unit 207 of the sharing source apparatus 107 into the data storage unit 207 of the browsing apparatus 104, display the browsing-instructed tab, and delete the data of SessionStorage linked with the tab from the data storage unit 207 of the sharing source apparatus 107. As a result, the browsing apparatus 104 can display the browsing-instructed tab while maintaining the tab in the same state as when browsed by the sharing source apparatus 107. The deletion of the data from the sharing source apparatus 107 can implement the specification for not sharing or using data of SessionStorage between different tabs.

Consequently, for example, even if the sharing source apparatus 107 is operated while the tab is browsed on the browsing apparatus 104, the page number or the shopping cart on the browsing apparatus 104 side will not be changed in a conflicting manner. This can avoid unintended page transitions and unintended modifications to the shopping cart.

A button for not handing over 702 is intended to display the browsing-instructed tab without handing over the data of SessionStorage of the sharing source apparatus 107 to the browsing apparatus 104. A cancel button 703 is intended to cancel the browsing instruction.

Figure 8:
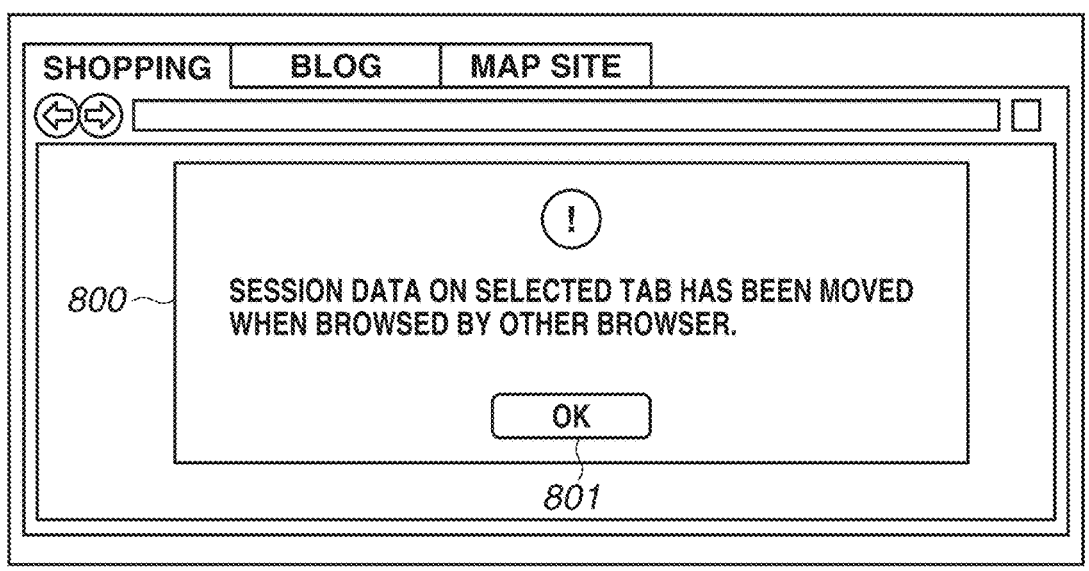
FIG. 8 is a diagram illustrating a deletion notification screen of SessionStorage.

FIG. 8 is a diagram illustrating an example of a deletion notification screen displayed on the web browser 201 of the sharing source apparatus 107 from which the data of SessionStorage is deleted.

In FIG. 8, a deletion notification screen 800 is displayed when the data of SessionStorage is stored into the browsing apparatus 104 by using the hand over button 701 of FIG. 7 and the data is deleted from the sharing source apparatus 107.

If the user presses an OK button 801, the website can be browsed without the data of SessionStorage. The deletion notification screen 800 may display information about the browsing apparatus 104 which has issued the deletion instruction, and the date and time of the deletion instruction.

Figure 9:
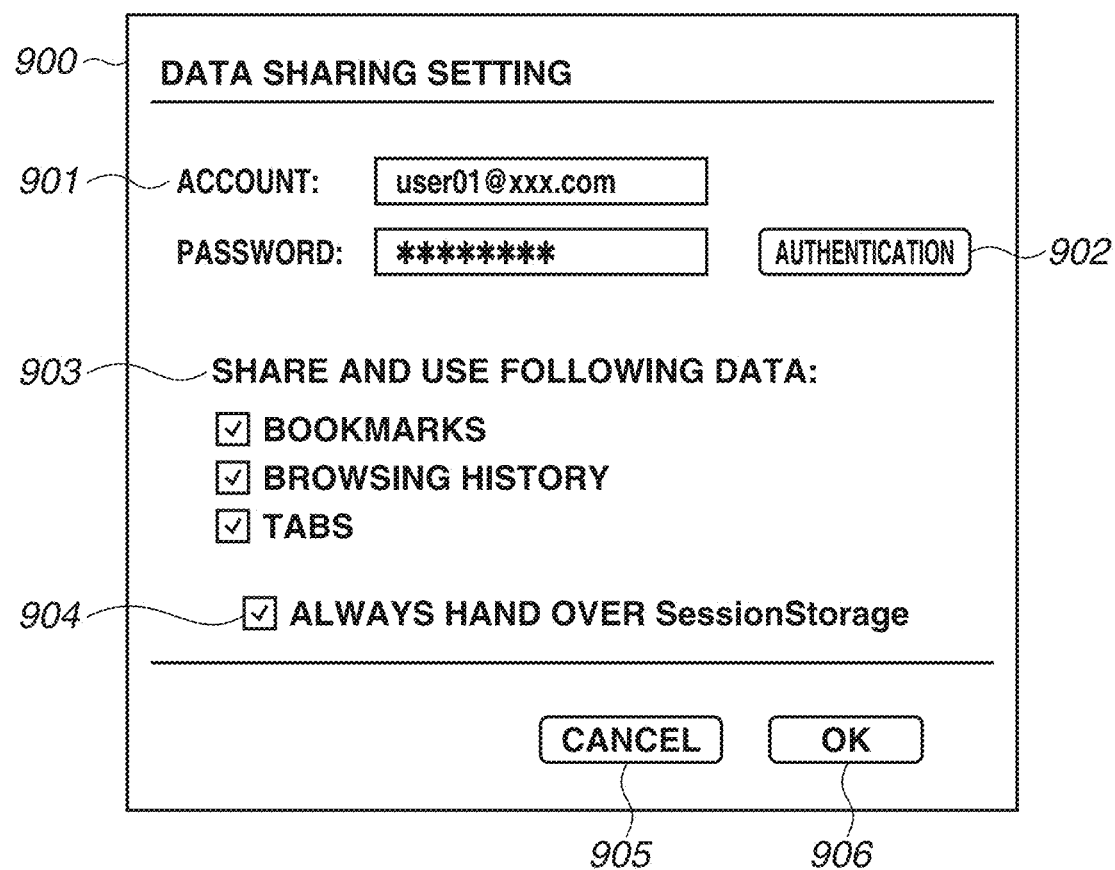
FIG. 9 is a diagram illustrating a data sharing setting screen.

FIG. 9 is a diagram illustrating an example of a data sharing setting screen displayed on the web browsers 201 of the information processing apparatuses 104 and 107.

In FIG. 9, a data sharing setting screen 900 is displayed if the menu button 601 of FIG. 6 is pressed and "data sharing setting" is selected from the function list (not illustrated).

An account input screen 901 inputs information for identifying a range of data sharing. If the user input an account and a password and presses an authentication button 902, information for associating account information and the information processing apparatus is registered in the data sharing server 108.

Shared data selection checkboxes 903 are intended to select pieces of data to be shared and used between the information processing apparatuses 104 and 107. The data selected here is synchronized with the data sharing server 108. In the example of FIG. 9, bookmarks, browsing history, and tabs can be selected. The data is not limited thereto.

A check box 904 is intended to make a setting to hand over SessionStorage without displaying the confirmation screen 700 of FIG. 7 whenever a tab using SessionStorage is selected. Checking on the checkbox 904 can save the user selecting the hand over button 701 in the confirmation screen 700 of FIG. 7.

If an OK button 906 is pressed, the foregoing setting is stored in the web browser 201. A cancel button 905 is intended to discard the foregoing setting and restore the state before the display of the data sharing setting screen 900.

Figure 10:
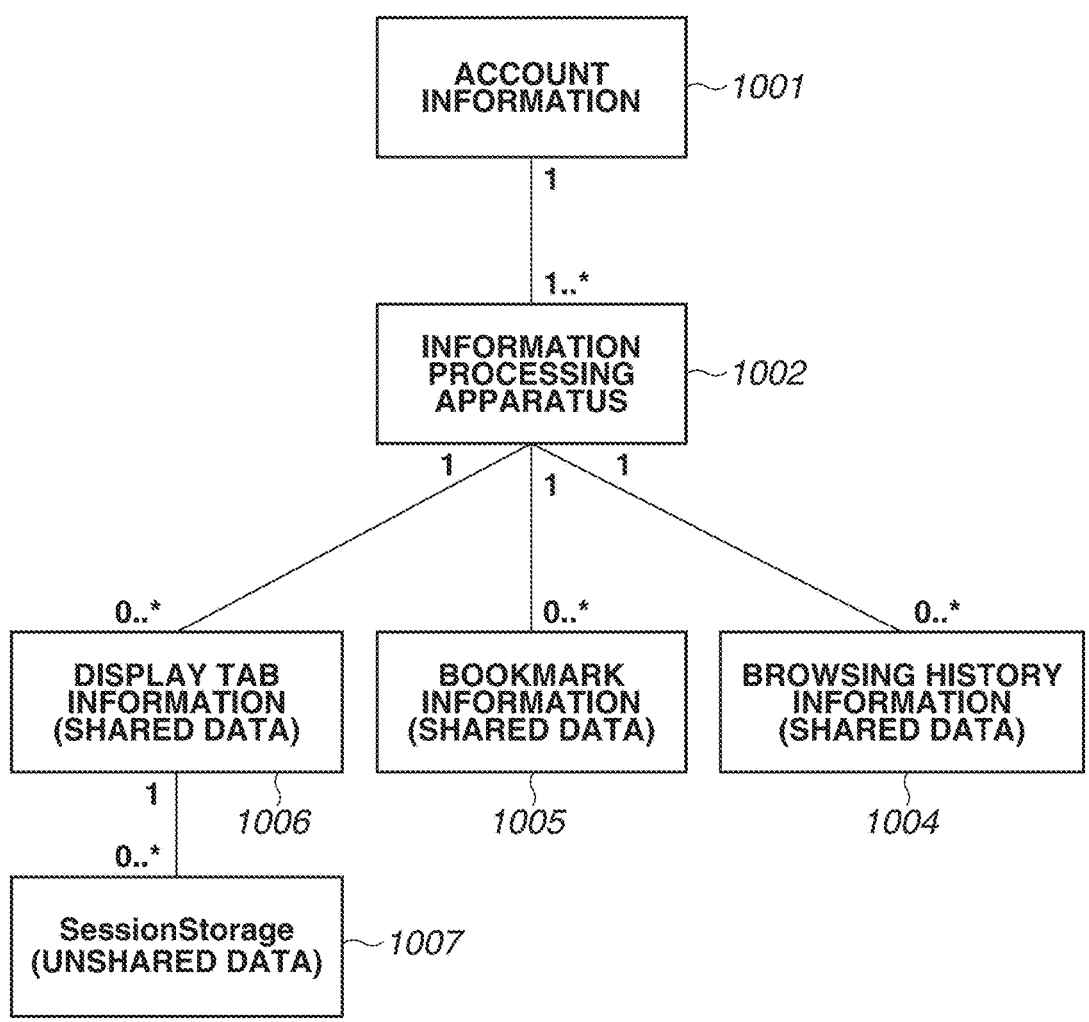
FIG. 10 is a diagram illustrating a data model managed by the data sharing server.

FIG. 10 is a diagram illustrating an example of a data model managed by the data sharing server 108. In FIG. 10, the numerals illustrated between the pieces of data indicate multiplicity according to the notation of the Unified Modeling Language (UML). The range of relevant data is defined in the form of "lower limit . . . upper limit (* represents infinite)." For example, "0 ... *" indicates that there is zero or more pieces of linked data.

Account information 1001 is information for identifying the range of data sharing. One or more information processing apparatuses 1002 are linked with the account information 1001. The information processing apparatuses 1002 linked with the account information 1001 can share data therebetween. If the web browser 201 has a user management function aside from the foregoing account for data sharing, the data sharing may be performed within the range of the same account for data sharing and the same user of the web browser 201.

Display tab information 1006 is information about tabs opened in the web browser(s) 201 of the information processing apparatus(es) 1002. Zero or more pieces of display tab information 1006 are linked with the information processing apparatus(es) 1002. The display tab information 1006 includes information about the URLs and page titles of websites opened in the tabs, and time stamps of update of the display tab information 1006.

Zero or more pieces of SessionStorage 1007 are linked with the display tab information 1006. That the number of pieces of linked the SessionStorage 1007 is zero represents a state where the website opened in that tab does not use SessionStorage.

Browsing history information 1004 is information used by a data sharing function of the browsing history 605 in FIG. 6. Zero or more pieces of browsing history information 1004 are linked with the information processing apparatus(es) 1002. The browsing history information 1004 includes information about the URLs and page titles of websites registered in the browsing history, and time stamps of update of the browsing history information 1004. Bookmark information 1005 is information used by a data sharing function of the bookmarks 604 in FIG. 6. Zero or more pieces of bookmark information 1005 are linked with the information processing apparatus(es) 1002. The bookmark information 1005 includes information about the URLs and page titles of websites registered as bookmarks, and time stamps of update of the bookmark information 1005.

In the data model described above, the browsing history information 1004, the bookmark information 1005, and the display tab information 1006 are shared data. When the information processing apparatuses 104 and 107 connect to the data sharing server 108, the web browsers 201 of the information processing apparatuses 104 and 107 duplicate and store the shared data into the respective data storage units 207 of the information processing apparatuses 104 and 107.

The SessionStorage 1007 is unshared data according to the foregoing specification. Even when the information processing apparatuses 104 and 107 connect to the data sharing server 108, the unshared data will not be copied or stored into the information processing apparatuses 104 and 107. The example illustrated in FIG. 10 is just an example of the data model. The data model is not limited thereto.

FIG. 11 is a diagram illustrating an example of data of the data model managed by the data sharing server 108.

The example of FIG. 11 illustrates a state where three tabs are opened in the web browser 201 of the sharing source apparatus 107 which is a tablet, and no tab is opened in the web browser 201 of the browsing apparatus 104 which is a PC.

Account information 1101 and an information processing apparatus 1102 refer to the foregoing account information 1001 and information processing apparatus 1002. In the example of FIG. 11, information processing apparatuses: tablet and PC are linked with an account: user01@xxx.com.

A tab ID 1103, a URL 1104, and a page title 1105 are examples of the display tab information 1006. The tab ID 1103 lists unique IDs representing the tabs displayed on the web browser 201. The URL 1104 lists the URLs of the websites opened in the tabs. The page title 1105 lists the page titles of the websites.

SessionStorage 1106 is an example of the SessionStorage 1007. For tabs using SessionStorage, the SessionStorage 1106 manages the information described above in FIG. 5. For tabs not using SessionStorage, the SessionStorage 1106 is empty.

A time stamp 1107 lists the dates and times at which the respective records are changed by the data sharing server 1008.

Although not illustrated in FIG. 11, the bookmark information 1005 and the browsing history information 1004 are managed in a manner similar to the other information. The data illustrated in FIG. 11 is just an example, and the data management method and the data format are not limited thereto.

FIG. 12 is a diagram illustrating an example of the data of the data model managed by the data sharing server 108, after the data handover.

The example of the data illustrated in FIG. 12 illustrates a state after "shopping" on the display tab list 606 of FIG. 6 is selected in the state of the data illustrated in FIG. 11 and the SessionStorage of the sharing source apparatus 107 is handed over to the browsing apparatus 104 by using the hand over button 701 of FIG. 7.

If the data sharing server 108 receives an instruction to hand over the display of the tab and the SessionStorage in the first row of the sharing source apparatus 107 which is the tablet from the browsing apparatus 104 which is the PC, the data sharing server 108 moves the SessionStorage 1206 to the browsing apparatus 104 which is the PC.

Since the information of the SessionStorage 1206 is changed, the data sharing server 108 changes the first and fourth rows of the time stamp 1207 to the date and time of change. As will be described below in FIG. 16, the sharing source apparatus 107 synchronizes the data of the first row based on the time stamp 1207. The sharing source apparatus 107 thereby deletes the SessionStorage stored in the data storage unit 207 of the sharing source apparatus 107.

Figure 13:
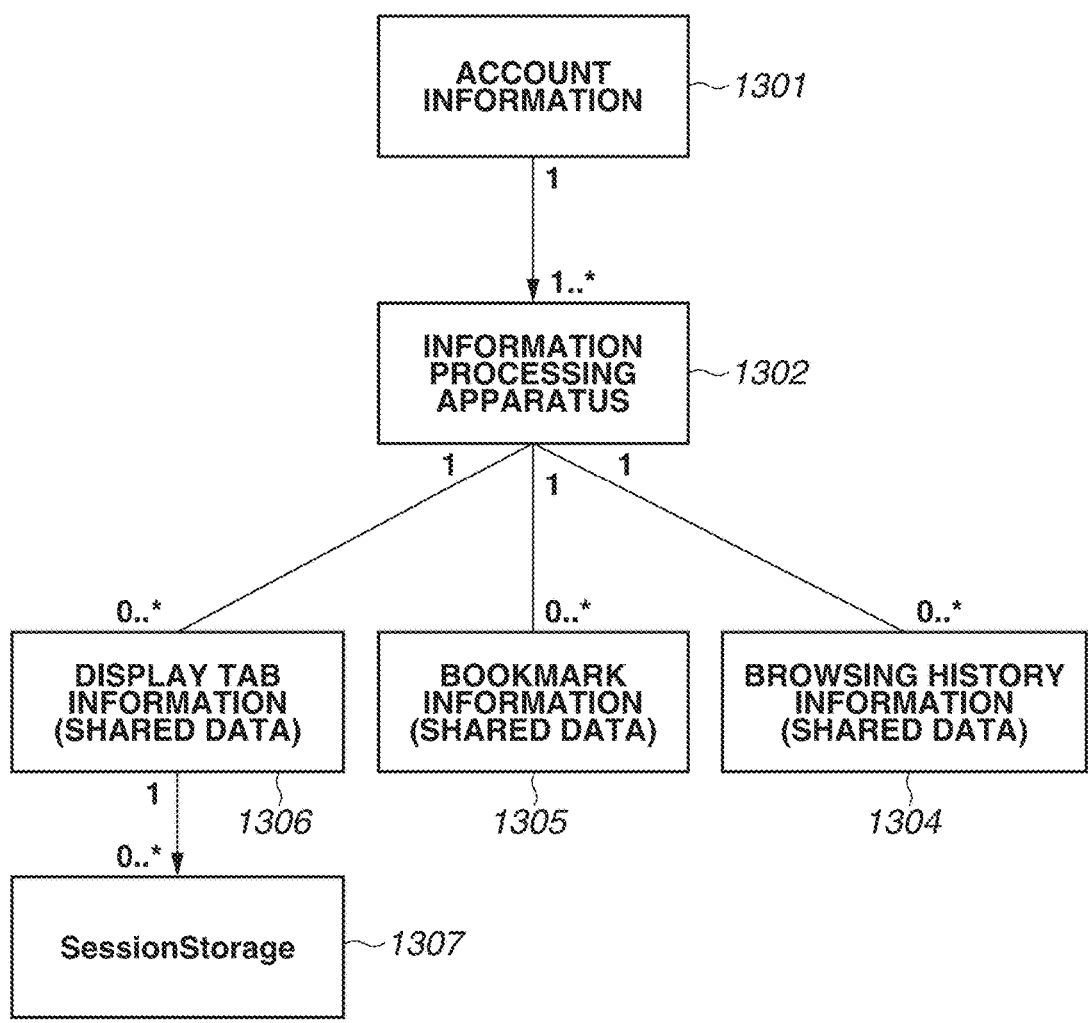
FIG. 13 illustrates an example of data model managed by the information processing apparatuses.

FIG. 13 is a diagram illustrating an example of a data model managed by the information processing apparatuses 104 and 107.

Pieces of data 1301 to 1306 illustrated in FIG. 13 are similar to the pieces of data 1001 to 1006 of the data sharing server 108 described above in FIG. 10. SessionStorage 1307 is unshared data, in which information about other information processing apparatuses is not stored.

For example, the information processing apparatus 104 stores only the SessionStorage 1307 of the information processing apparatus 104 managed by the data sharing server 108, and does not store the SessionStorage 1307 of the information processing apparatus 107. Similarly, the information processing apparatus 107 stores only the SessionStorage 1307 of the information processing apparatus 107 managed by the data sharing server 108, and does not store the SessionStorage 1307 of the information processing apparatus 104.

Figure 14:
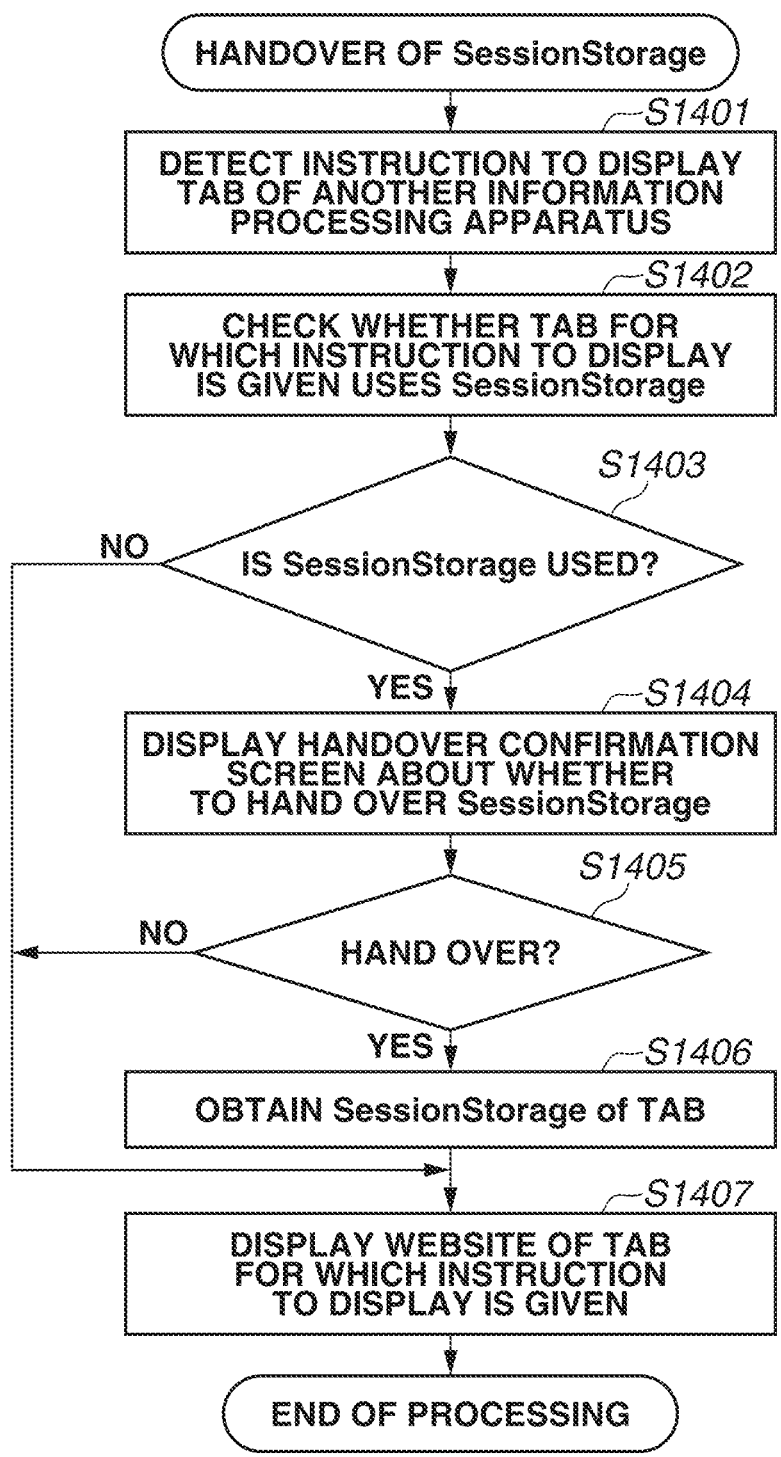
FIG. 14 is a flowchart of processing when displaying a tab of another web browser.

FIG. 14 is a flowchart illustrating processing when the web browser 201 of the browsing apparatus 104 displays a tab of the sharing source apparatus 107. The CPU 301 of the information processing apparatus 104 on which the web browser 201 runs executes the programs stored in the HDD 308, and thereby, the processing illustrated in the flowchart is implemented. If the information processing apparatus 107 is used for browsing, the processing is implemented by the AP 420 executing the programs stored in the storing device 416. In FIG. 14, reference numerals with an 'S' represent step numbers.

In step S1401, the web browser 201 detects that an instruction to display a tab of another information processing apparatus is given from the screen of FIG. 6 (for example, the user selects "shopping," "blog," or "map site" from the display tab list 606 of FIG. 6). The processing proceeds to step S1402.

In step S1402, the web browser 201 inquires of the data sharing server 108 to check whether the tab for which the instruction to display is given in the foregoing step S1401 uses the SessionStorage 1007.

As described above in FIG. 5, SessionStorage can store information about a plurality of websites including those of third parties. Then, in step S1402, the web browser 201 may check whether there is SessionStorage of the website 501 of the same domain as that of the website of the display-instructed tab. This can avoid an unnecessary display of handover confirmation if the SessionStorage is used by a third-party advertisement or widget that is not directly relevant to the website of the display-instructed tab.

In step S1403, the web browser 201 determines whether the tab for which the instruction to display is given in the foregoing step S1401 uses the SessionStorage 1007 based on the checking result in the foregoing step S1402.

If the display-instructed tab is determined to use the SessionStorage 1007 (YES in step S1403), the processing proceeds to step S1404.

In step S1404, the web browser 201 displays the confirmation screen 700 about whether to hand over the SessionStorage 1007 of FIG. 7. The processing proceeds to step S1405.

In step S1405, the web browser 201 determines whether an instruction to hand over is given (the hand over button 701 of FIG. 7 is pressed) on the confirmation screen 700 displayed in the foregoing step S1404.

If an instruction to hand over is determined to be given (YES in step S1405), the processing proceeds to step S1406.

In step S1406, the web browser 201 transmits a handover request for the SessionStorage 1007 of the tab for which the instruction to display is given in the foregoing step S1401, to the data sharing server 108. The web browser 201 obtains the SessionStorage 1007 of the tab for which the instruction to display is given in the foregoing step S1401 from the data sharing server 108, and stores (locally manages) the SessionStorage 1007 into the data storage unit 207. The processing proceeds to step S1407. The handover request for the SessionStorage 1007 corresponds to an instruction to hand over the SessionStorage 1007 and share the tab of the web browser 201 of the sharing source apparatus 107 with the web browser 201 of the browsing apparatus 104. The data sharing server 108 receiving the handover request for the SessionStorage 1007 transmits access data (URL) related to the tab for which the instruction to display is given in the foregoing step S1401 and data of the SessionStorage 1007 to the web browser 201 that is the transmission source of the handover request for the SessionStorage 1007. Such data is received by the web browser 201 in the foregoing step S1406. Either one of the processing for transmitting the SessionStorage 1007 by the data sharing server 108 described above and processing of steps S1502 and S1503 of FIG. 15 to be described below may be performed first. Both may be performed in parallel.

In the foregoing step S1403, if the display-instructed tab is determined not to use the SessionStorage 1007 (NO in step S1403), the processing simply proceeds to step S1407.

In the foregoing step S1405, if an instruction to hand over is determined not to be given (the button for not handing over 702 of FIG. 7 is pressed) (NO in step S1405), the processing also simply proceeds to step S1407.

In step S1407, the web browser 201 displays the website of the tab for which the instruction to display is given in the foregoing step S1401. If the SessionStorage 1007 is obtained in the foregoing step S1406, the web browser 201 here displays the website of the display-instructed tab by using the SessionStorage 1007.

Although not illustrated in FIG. 14, if the cancel button 703 of FIG. 7 is determined to be pressed, the processing of this flowchart ends without performing step S1407.

In the present exemplary embodiment, the acquisition of the SessionStorage 1007 in the foregoing step S1406 and the display of the website in the foregoing step S1407 are performed in a sequential manner. However, such processing may be performed in parallel to accelerate the display speed.

The user may check the checkbox 904 to make a setting to always hand over the SessionStorage 1007. In such a case, if the determination of step S1403 is YES, the processing of step S1404 is skipped. In step S1405, the web browser 201 makes a YES determination, and the processing proceeds to step S1406.

Figure 15:
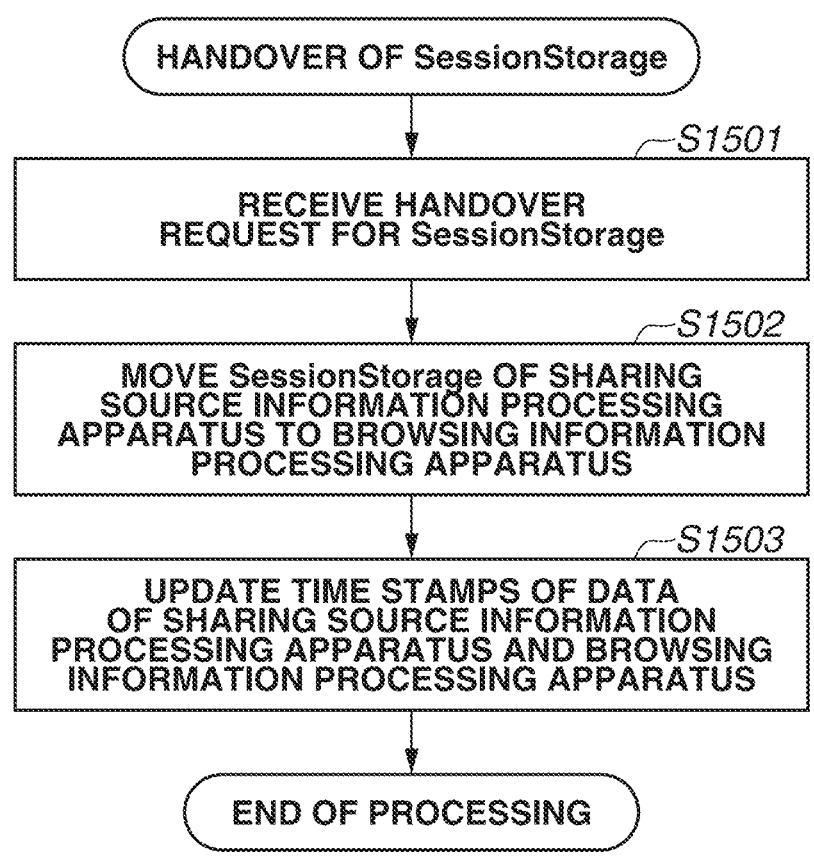
FIG. 15 is a flowchart of processing when the data sharing server receives a handover request.

FIG. 15 is a flowchart illustrating processing when the data sharing server 108 receives a handover request for SessionStorage. The processing illustrated in the flowchart is implemented by the CPU 301 of the data sharing server 108 executing the programs stored in the HDD 308. In FIG. 15, reference numerals with an 'S' represent steps.

In step S1501, the data sharing server 108 receives a handover request for SessionStorage (including information identifying the SessionStorage) from the web browser 201 of the browsing apparatus 104. The processing proceeds to step S1502.

In step S1502, the data sharing server 108 moves the SessionStorage 1007 of the sharing source apparatus 107 corresponding to the handover request received in the foregoing step S1501 to the SessionStorage 1007 of the browsing apparatus 104. Here, as described above in FIG. 12, the data sharing server 108 does not copy the SessionStorage 1007 from the sharing source apparatus 107 to the browsing apparatus 104, but moves the data of the SessionStorage 1007. The data sharing server 108 thereby deletes the SessionStorage 1007 from the corresponding tab of the sharing source apparatus 107.

Finally, in step S1503, the data sharing server 108 updates the time stamps 1107 of the data of the sharing source apparatus 107 and the browsing apparatus 104 managed by the data sharing server 108.

Although not illustrated in FIG. 15, the data sharing server 108 transmits the access data (URL) related to the handover request and the data of the SessionStorage 1007 to the web browser 201 corresponding to the transmission source of the handover request for the SessionStorage received in the foregoing step S1501. This data is the data of the SessionStorage 1007 obtained in step S1406 of FIG. 14. Either one of the processing for transmitting the SessionStorage 1007 by the data sharing server 108 and the processing of the foregoing steps S1502 and S1503 may be performed first. Both may be performed in parallel.

Figure 16:
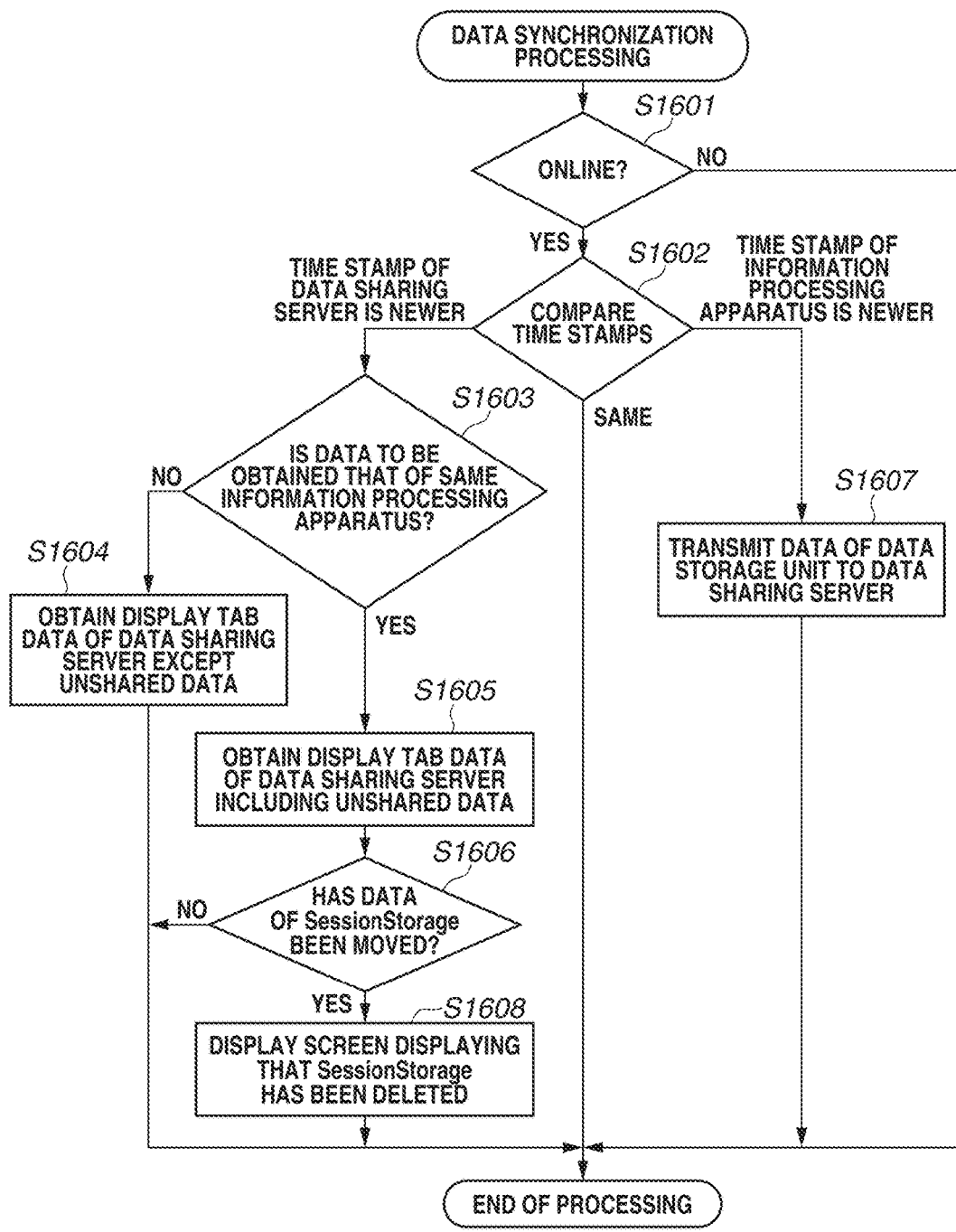
FIG. 16 is a flowchart of processing when a web browser synchronizes data.

FIG. 16 is a flowchart illustrating processing when the web browsers 201 of the information processing apparatuses 104 and 107 synchronize data between the data sharing server 108 and the data storage unit 207 (data synchronization processing). If the information processing apparatus 104 performs the processing of this flowchart, the CPU 301 of the information processing apparatus 104 on which the web browser 201 runs executes the programs stored in the HDD 308, and thereby, the processing is implemented. If the information processing apparatus 107 performs the processing of the flowchart, the AP 420 of the information processing apparatus 107 on which the web browser 201 runs executes the programs stored in the storage device 416, and thereby, the processing is implemented.

In step S1601, the web browser 201 checks whether the information processing apparatus on which the web browser 201 runs is online. If the information processing apparatus is determined to be online (YES in step S1601), the processing proceeds to step S1602.

In step S1602, the web browser 201 connects to the data sharing server 108, and compares the time stamp included in the display tab information 1306 managed by the information processing apparatus on which the web browser 201 runs with the time stamp 1006 managed by the data sharing server 108. If the time stamp of the data sharing server 108 is determined to be newer ("TIME STAMP OF DATA SHARING SERVER IS NEWER" in step S1602), the processing proceeds to step S1603.

In step S1603, the web browser 201 determines whether the data to be obtained is that of the same information processing apparatus as the information processing apparatus on which the web browser 201 runs.

If the data to be obtained is determined to be that of an information processing apparatus different from the information processing apparatus on which the web browser 201 runs (NO in step S1603; for example, if the PC 104 obtains the display tab information of the tablet 107), the processing proceeds to step S1604.

In step S1604, the web browser 201 obtains the display tab information 1006 of the data sharing server 108 except the unshared data (SessionStorage 1007), and updates the data storage unit 207. The processing of the flowchart ends.

In the foregoing step S1603, if the data to be obtained is determined to be that of the same information processing apparatus as the information processing apparatus on which the web browser 201 runs (YES in step S1603; for example, the PC 104 obtains the display tab information of the PC 104), the processing proceeds to step S1605.

In step S1605, the web browser 201 obtains the display tab information 1006 including the unshared data (SessionStorage 1007), and updates the data storage unit 207.

In step S1606, the web browser 201 determines whether the data of the SessionStorage has been moved by a handover instruction from another information processing apparatus. For example, if the SessionStorage 1307 stored in the own information processing apparatus is not found in the SessionStorage 1007 obtained in the foregoing S1605, the web browser 201 determines that the data of the SessionStorage has been moved by a handover instruction from another information processing apparatus.

If the data of the SessionStorage is determined to have been moved by a handover instruction from another information processing apparatus (YES in step S1606), the processing proceeds to step S1608.

In step S1608, the web browser 201 displays the screen displaying that the SessionStorage has been deleted (the deletion notification screen 800 of FIG. 8). The processing of the flowchart ends.

In the foregoing step S1606, if the data of the SessionStorage is determined not to have been moved by a handover instruction from another information processing apparatus (NO in step S1606), the processing of the flowchart ends.

In the foregoing step S1602, if the time stamp included in the display tab information 1306 managed by the information processing apparatus is determined to be the same as the time stamp 1006 managed by the data sharing server 108 ("SAME" in step S1602), the processing of the flowchart ends.

In the foregoing step S1602, if the time stamp included in the display tab information 1306 managed by the information processing apparatus is determined to be newer ("TIME STAMP OF INFORMATION PROCESSING APPARATUS IS NEWER" in step S1602), the processing proceeds to step S1607.

In step S1607, the web browser 201 transmits the display tab information 1306 and the SessionStorage 1307 of the data storage unit 207 to the data sharing server 108. The processing of the flowchart ends. The data sharing server 108 receives the data transmitted in the foregoing step S1607, and updates the data stored in the data sharing server 108 based on the received data. More specifically, the data sharing server 108 receives the data of the data storage unit 207 transmitted in the foregoing step S1607, and stores the received data into a storage area managed by the data sharing server 108 in association with the transmission-source information processing apparatus.

In the foregoing step S1601, if the information processing apparatus on which the web browser 201 runs is determined to be offline (NO in step S1601), the processing of the flowchart simply ends.

The timing to perform the data synchronization processing illustrated in FIG. 16 is not limited in particular. The data synchronization processing may be performed regularly, upon activation of the web browser 201, upon recovery of the information processing apparatuses 104 and 107 from a power saving mode, or in any combination of these.

The present exemplary embodiment has been described by using SessionStorage as an example of data of a specification for not sharing data between different tabs of a single web browser. However, the data of such a specification is not limited to SessionStorage. In other words, an exemplary embodiment of the present invention may be applied to data of any specification for not sharing data between different tabs of a single web browser.

As described above, in the network system according to the present exemplary embodiment, when the web browser 201 running on an information processing apparatus shares and uses a tab opened in a web browser running on a different information apparatus, the web browser 201 checks whether the tab uses SessionStorage. If the tab uses SessionStorage, the web browser 201 obtains the SessionStorage from the data sharing server 108, and the data sharing server 108 deletes the SessionStorage of the tab from the sharing source apparatus. Such a configuration can provide a mechanism for referring to a tab using data of a specification for not sharing data between different tabs (for example, SessionStorage) by using the tab sharing of web browsers without duplicating the data between the web browsers.

Conventionally, if data of a specification for not sharing data between different tabs of a single web browser like SessionStorage is shared and used between web browsers of different information processing apparatuses, an operation intended by the website side may be unable to be implemented due to the violation of the original specification. According to the present exemplary embodiment, data of a specification for not sharing data between different tabs of a single web browser like SessionStorage can be shared between web browsers in consideration of the specification.

In the first exemplary embodiment, as described above in FIG. 10, the SessionStorage 1007 is unshared data. The web browser 201 is thus configured not to duplicate or store the SessionStorage 1007 into the data storage units 207 of the information processing apparatuses 104 and 107. In a second exemplary embodiment, a duplicate of the data of the SessionStorage 1007 itself will not be stored, either. The web browser 201 according to the second exemplary embodiment stores only information indicating the presence or absence of use about whether a tab uses SessionStorage, into the data storage units 207 as shared data.

With such a configuration, according to the second exemplary embodiment, in step S1402 of FIG. 14, the web browser 201 checks the presence or absence of use of SessionStorage. Here, the web browser 201 does not inquire of the data sharing server 108 but uses the information in the data storage unit 207 (information indicating the presence or absence of use about whether the tab uses SessionStorage) for checking. Since the web browser 201 does not need to connect to the data sharing server 108 when checking the presence or absence of use of SessionStorage, the checking time can be reduced. In addition, since the presence or absence of use of SessionStorage is known before selecting a tab of the sharing source apparatus 107, a shared tab display screen such as illustrated in FIG. 17 can be displayed.

Figure 17:
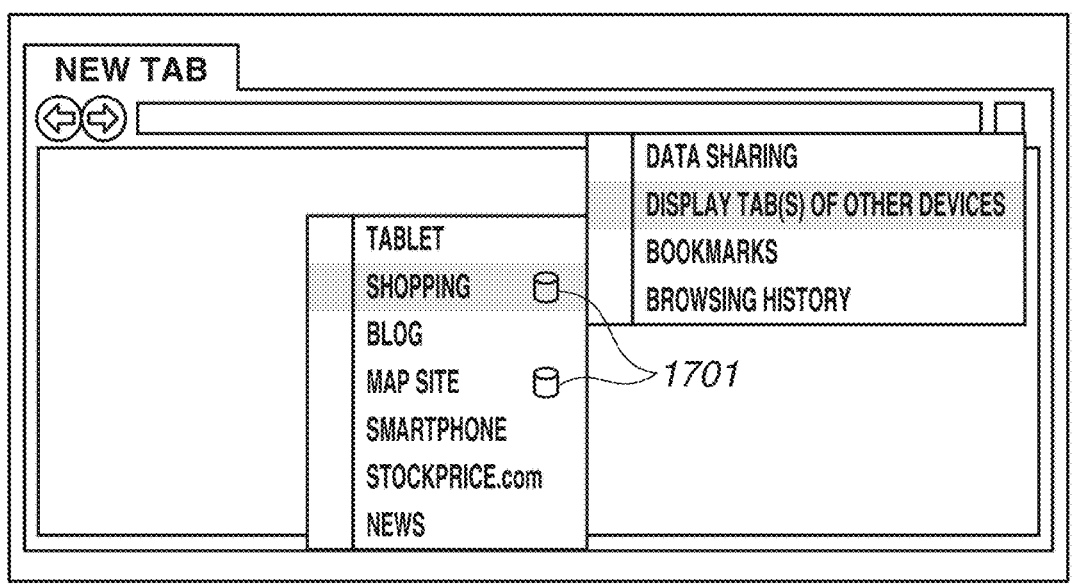
FIG. 17 illustrates a selection screen of a tab of another web browser according to a second exemplary embodiment.

FIG. 17 is a diagram illustrating an example of a screen displayed on the web browser 201 of the information processing apparatus 104 when the information processing apparatus 104 shares and uses a tab of the web browser 201 of the information processing apparatus 107.

In FIG. 17, SessionStorage use icons 1701 indicate that the corresponding tabs of the sharing source apparatus 107 use SessionStorage.

The display of the SessionStorage use icons 1701 such as illustrated in FIG. 17 enables the user to easily recognize that the corresponding tabs of the sharing source apparatus 107 use SessionStorage.

In the first and second exemplary embodiment, the web browser 201 of the browsing apparatus 104 has been described to be configured to store and use SessionStorage in the data storage unit 207 if instructed to take over the SessionStorage. In a third exemplary embodiment, the web browser 201 of the browsing apparatus 104 is configured not to store SessionStorage into the data storage unit 207 even if instructed to take over the SessionStorage. The web browser 201 is configured to instead access and use the SessionStorage stored in the data sharing server 108.

In the first and second exemplary embodiments, SessionStorage can be temporarily stored in both the browsing apparatus 104 and the sharing source apparatus 107 until the sharing source apparatus 107 synchronizes data with the data sharing server 108. In the third exemplary embodiment, no SessionStorage is stored in the data storage unit 207 of the browsing apparatus 104 when the data sharing function is used. This enables browsing with a SessionStorage handover while strictly adhering to the specification of SessionStorage not to share data between different tabs.

As described above, according to an exemplary embodiment of the present invention, data of a specification for not sharing data between different tabs of a single web browser like session storage can be shared between web browsers in consideration of the specification.

It will be understood that the configurations and contents of the foregoing various types of data are not restrictive, and various configurations and contents may be employed depending on the intended use and purpose.

While several exemplary embodiments of the present invention have been described above, an exemplary embodiment of the present invention may be implemented, for example, as a system, an apparatus, a method, a program, or a recording medium. Specifically, an exemplary embodiment of the present invention may be applied to a system including a plurality of apparatuses. An exemplary embodiment of the present invention may be applied to an apparatus including a single device.

All combinations of the foregoing exemplary embodiments are also covered by the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-226273, filed Nov. 6, 2014, which is hereby incorporated by reference herein in its entirety.

What is claimed is:

1. A network system comprising:
a first information processing terminal on which a first web browser runs;
a second information processing terminal on which a second web browser runs; and
a shared server,
wherein the shared server includes a memory storing instructions and a processor which is capable of executing the instructions causing the shared server to:
manage access data on a first tab of the first web browser in which to access a website and data on session storage valid for a session with the website in association with the first information processing terminal, the data on the session storage being locally managed by the first web browser in association with the first tab, wherein the data on the session storage includes data defined by using a combination of a key and a value that are designated by the website, receive an instruction for sharing the first tab of the first web browser with the second web browser, transmit the access data and the data on the session storage related to the first tab to the second web browser according to the instruction, delete association between the transmitted data on the session storage and the first information processing terminal so that the data on the session storage being locally managed by the first web browser is deleted by the first web browser, and manage the data on the session storage in association with the second information processing terminal.

2. The network system according to claim 1, wherein the second web browser manages the data on the session storage related to the first tab transmitted from the shared server according to the instruction, as local session storage of the second web browser, and displays the website related to the access data on the first tab.

3. The network system according to claim 2, wherein, if a display instruction for the first tab of the first web browser is detected, the second web browser confirms whether to hand over the data on the session storage of the first tab of the first web browser to a second tab of the second web browser, and if the data is confirmed to be handed over, transmits the instruction to the shared server.

4. The network system according to claim 3, wherein the second web browser includes a setting to hand over the data on the session storage of the first tab of the first web browser to the second tab of the second web browser, and wherein the second web browser transmits, according to the setting, the instruction to the shared server without confirming whether to hand over.

5. The network system according to claim 1, wherein the access data related to the first tab includes a URL.

6. The network system according to claim 1, wherein, if the association between the data on the session storage transmitted to the second web browser and the first information processing terminal is deleted, the first web browser notifies a user of it.

7. The network system according to claim 6, wherein the first web browser detects that the association between the data on the session storage and the first information processing terminal is deleted, by comparing the data on the session storage related to the first tab locally managed by the first web browser with the data on the session storage related to the first tab managed by the shared server in association with the first information processing terminal.

8. A control method of a network system including a first information processing terminal on which a first web browser runs, a second information processing terminal on which a second web browser runs, and a shared server, the control method comprising:

managing access data on a first tab of the first web browser in which to access a website and data on session storage valid for a session with the website in association with the first information processing terminal in a storage area of the shared server, the data on the session storage being locally managed by the first web browser in association with the first tab, wherein the data on the session storage includes data defined by using a combination of a key and a value that are designated by the website;

receiving an instruction for sharing the first tab of the first web browser with the second web browser;

transmitting the access data and the data on the session storage related to the first tab to the second web browser according to the instruction;

deleting association between the transmitted data on the session storage and the first information processing terminal so that the data on the session storage being locally managed by the first web browser is deleted by the first web browser; and managing the data on the session storage in association with the second information processing terminal, in the storage area.

* * * * *